Patented Mar. 16, 1948

2,437,719

UNITED STATES PATENT OFFICE 2,437,719

A BENZOIC ACID dl-CIS-2-(4'-CARBOXY-BUTYL)-3:4-DIAMINO-TETRAHYDRO-THIOPHENE SULFATE COMPLEX

Donald E. Wolf and Anthony C. Shabica, Jr., Rahway, N. J., assignors to Merck & Co., Inc., Rahway, N. J., a corporation of New Jersey No Drawing. Application September 16, 1944, Serial No. 554,459

9 Claims. (Cl. 260—329)

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

$$\begin{array}{c} O \\ \| \\ HN-C-NH \\ | \quad\quad | \\ HC\text{------}CH \\ | \quad\quad | \\ H_2C-S-CHCH_2CH_2CH_2CH_2CO_2H \end{array}$$

It is now found that this compound can be synthesized by reactions indicated as follows:

$$\begin{array}{c} NH_2 \\ | \\ CH-CO_2H \\ | \\ CH_2-SH \end{array} \xrightarrow{XCH_2CO_2H} \begin{array}{c} NH_2 \\ | \\ CH-CO_2H \\ | \\ CH_2-S-CH_2CO_2H \end{array}$$
(1) \quad\quad\quad\quad (2)

$$\downarrow RCOX$$

$$\begin{array}{c} RCO \\ | \\ NH \\ | \\ CH-CO_2R \\ | \\ CH_2-S-CH_2CO_2R \end{array} \xleftarrow{ROH} \begin{array}{c} RCO \\ | \\ NH \\ | \\ CH-CO_2H \\ | \\ CH_2-S-CH_2CO_2H \end{array}$$
(4) \quad\quad\quad\quad (3)

$$\downarrow ROM$$

$$\begin{array}{c} RCO \\ | \\ NH \quad\quad O \\ | \quad\quad \| \\ CH\text{------}C \\ | \quad\quad | \\ CH_2-S-C\,CO_2R \\ \quad\quad\quad | \\ \quad\quad\quad M \end{array} \xrightarrow[\text{heat}]{H^+, H_2O} \begin{array}{c} RCO \\ | \\ NH \quad\quad O \\ | \quad\quad \| \\ CH\text{------}C \\ | \quad\quad | \\ CH_2-S-CH_2 \end{array}$$
(5) \quad\quad\quad\quad (6)

$$O=CH(CH_2)_3CO_2R \downarrow$$

$$\begin{array}{c} RCO \\ | \\ NH \quad\quad NOH \\ | \quad\quad \| \\ CH\text{------}C \\ | \quad\quad | \\ CH_2-S-C=CH(CH_2)_3CO_2R \end{array} \xleftarrow{NH_2OH} \begin{array}{c} RCO \\ | \\ NH \quad\quad O \\ | \quad\quad \| \\ CH\text{------}C \\ | \quad\quad | \\ CH_2-S-C=CH(CH_2)_3CO_2R \end{array}$$
(8) \quad\quad\quad\quad (7)

$$\begin{array}{c} (RCO)_2O \\ H_2 \end{array} \downarrow$$

$$\begin{array}{cc} RCO \quad RCO & RCO \quad RCO \\ | \quad\quad | & | \quad\quad | \\ NH \quad NH & NH \quad NH \\ | \quad\quad | & | \quad\quad | \\ CH\text{------}CH & CH\text{------}C \\ | \quad\quad | & | \quad\quad | \\ CH_2-S-C=CH(CH_2)_3CO_2R & CH_2-S-C-(CH_2)_4CO_2R \end{array}$$
(9a) \quad\quad\quad\quad (9b)

$$\downarrow \begin{array}{c} H_2 \\ \text{catalyst} \end{array}$$

$$\begin{array}{c} RCO \quad RCO \\ | \quad\quad | \\ NH \quad NH \\ | \quad\quad | \\ CH\text{------}CH \\ | \quad\quad | \\ CH_2-S-CH(CH_2)_4CO_2R \end{array}$$
(10)

$$\downarrow OH^-, \text{then } H^+$$

$$\begin{array}{c} NH_2 \quad NH_2 \\ | \quad\quad | \\ CH\text{------}CH \\ | \quad\quad | \\ CH_2-S-CH(CH_2)_4CO_2H \end{array}$$
(11)

$$\downarrow COX_2$$

$$\begin{array}{c} O \\ \| \\ HN-C-NH \\ | \quad\quad | \\ CH\text{------}CH \\ | \quad\quad | \\ CH_2-S-CH(CH_2)_4CO_2H \end{array}$$
(12)

In the above formulae, R represents an alkyl, aryl or arylalkyl group; X, a halogen; and M an alkali metal or an alkaline earth metal.

The reactions above indicated are conducted as follows: 2-amino-3-mercapto-propanoic acid (1) and chloroethanoic acid are condensed in an alkaline aqueous solution to form 2-amino-3-carboxy-methylmercapto-propanoic acid (2); which is then treated with an acylating agent, such as an acyl halide, in an aqueous alkaline solution to yield 2-acylamido-3-carboxymethyl-mercapto-propanoic acid (3). This product is esterified using a mineral acid catalyst, to produce the diester (4) of the acid (3), and the diester is treated with alkali metal alcoholate or an alkaline earth metal alcoholate to yield the 2-alkali metal or the 2-alkaline earth metal derivative of an ester of 2-carboxy-3-keto-4-acylamido-tetrahydrothiophene (5). This compound, when heated with a dilute mineral acid, is hydrolyzed and decarboxylated to produce 3-keto-4-acylamido-tetrahydrothiophene (6) which, when reacted with 4-carboxy-butanal ester in a lower aliphatic alcohol reaction medium containing piperidine and a lower aliphatic carboxylic acid, produces 2-(4'-carboalkoxy-butylidene)-3-keto-4-acylamido-tetrahydrothiophene (7). This product, when reacted with hydroxylamine yields an ester of the corresponding oxime, 2-(4'-carboxy-butylidene)-3-isonitroso-4-acylamido-tetrahydrothiophene (8) which upon treatment with a mixture of zinc, a lower aliphatic acid and a lower aliphatic acid anhydride, produces an equilibrium mixture of 2-(4'-carboxy-butylidene)-3:4-di(acylamido)-tetrahydrothiophene ester (9a) and 2-(4'-carboxy-butyl)-3:4-di(acylamido)-4:5-dihydrothiophene ester (9b). This equilibrium mixture, or if preferred, one of the equilibrants, is then treated with hydrogen in the presence of a hydrogenation catalyst to yield 2-(4'-carboxy-butyl)-3:4-di(acylamido)-tetrahydrothiophene ester (10). When this last mentioned compound is treated with an aqueous alkaline solution, hydrolysis of the acyl groups occurs, yielding upon acidification, 2-(4'-carboxy-butyl)-3:4-diamino-tetrahydrothiophene (11) which, when reacted with a carbonyl halide, produces the compound 2-(4'-carboxy-butyl)-3:4-ureido-tetrahydrothiophene. This product is obtained as a mixture of stereoisomers, one of which is racemic biotin, from which upon resolution, is obtained the dextrorotatory isomer, biotin.

When the vitamin biotin is prepared by synthesis as above indicated in general terms and as described in detail in concurrently filed applications Serial Nos. 554,458, 554,449, 554,450, 554,451, 554,452, 554,453, 554,454, 554,455, 554,456 and 554,457, the intermediate 11, 2-(4'-carboxy-butyl)-3:4-diamino-tetrahydrothiophene, is obtained as a mixture of racemates of stereoisomers of the acid sulfate, including 1. The trans-allo-stereoisomer racemate, melting point 228–230° C.;
2. The cis-stereoisomer racemate, melting point 249–250° C.; and
3. The trans-epiallo-stereoisomer racemate, melting point 283–285° C.

The present invention is concerned with a novel process for separating the above cis-stereoisomer racemate from the other racemates, and also is concerned with the novel compounds utilized in practice of said process.

In accordance with one aspect of the present invention, a compound represented by the formula

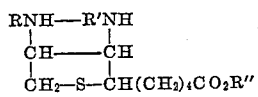

(wherein R and R' are acyl groups one of which is $C_6H_5CO$, and R'' is of the class consisting of alkyl, aryl and arylalkyl groups) is heated with an aqueous alkali to hydrolyze the acyl groups, then substantially neutralized with sulfuric acid and concentrated to cause separation of the least soluble component. Aqueous solutions of an alkali metal hydroxide or an alkaline earth metal hydroxide can be used in the foregoing hydrolysis. This least soluble component obtained according to the present invention is a novel complex of benzoic acid and the acid sulfate of dl-cis-2-(4'-carboxy-butyl)-3:4-diamino-tetrahydrothiophene (M. P. 255–256° C.). When treated with a carbonyl halide the complex yields directly dl-cis-2-(4'-carboxy-butyl)-3:4-ureido-tetrahydrothiophene (M. P. 232° C.), intermediate 12 above.

The following examples illustrate methods of carrying out the present invention, but it is to be understood that these examples are given by way of illustration and not of limitation.

*Example 1*

A mixture of about 665 g. of barium hydroxide, 66.5 g. of dl-cis-2-(4'-carbomethoxy-butyl)-3-acetamido-4-benzamido-tetrahydrothiophene and approximately 3325 cc. of water is heated about 16 hours at 140° C. (40–45 pounds/sq. in.), then cooled, acidified with sulfuric acid, filtered and concentrated in vacuo to a volume of about 500 cc. After cooling and standing, the complex product is obtained as a crystalline precipitate, dl-cis-2-(4'-carboxy-butyl)-3:4-diamino-tetrahydrothiophene-sulfate-benzoic-acid complex (M. P. 255–256° C.), having the empirical formula $C_{16}H_{26}S_2N_2O_8$ and the probable structural formula:

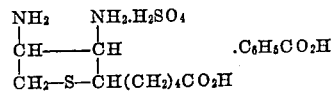

*Example 2*

About 30 g. of dl-cis-2-(4'-carbomethoxy-butyl)-3-acetamido-4-benzamido-tetrahydrothiophene, 300 g. of barium hydroxide octahydrate and 1500 cc. of water are mixed and heated with agitation at 140° C. for 16 hours, cooled to 10° C., acidified with sulfuric acid (50%) using Congo red as an indicator, centrifuged and chilled. The product, identical with that described in Example 1, is obtained upon standing.

*Example 3*

The operations described in Example 2 are repeated, substituting sodium hydroxide for the barium hydroxide, and the product obtained is identical with that of Example 1.

When the complex prepared as above described is extracted with ether the components of the complex are separated to benzoic acid and dl-cis-2-(4'-carboxy-butyl)-3:4-diamino-tetrahydrothiophene sulfate. The complex can be re-formed by mixing the calculated quantities of the diamino-carboxylic acid sulfate, benzoic acid and sulfuric acid in aqueous solution, concentrating and cooling, whereby the desired product is obtained.

Modification may be made in carrying out the present invention without departing from the spirit and scope thereof and the invention is to be limited only by the appended claims.

What is claimed is:

1. The process which comprises hydrolyzing a mixture of stereoisomers containing the dl-cis-isomer of a compound represented by the formula:

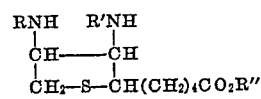

wherein R and R' are acyl groups, one of which is C₆H₅CO—, and R'' is a radical selected from the class consisting of alkyl, aryl and arylalkyl radicals, by heating said mixture of stereoisomers with an aqueous alkali at a temperature above 100° C. under pressure, acidifying the mixture thus obtained with sulfuric acid, to produce an aqueous solution containing a mixture of stereoisomers of 2-(4'-carboxy-butyl)-3:4-diamino-tetrahydrothiophene, benzoic acid and sulfuric acid, and subjecting the resulting solution to fractional crystallization thereby crystallizing the sparingly soluble dl-cis-2-(4'-carboxy-butyl)-3:4-diamino-tetrahydrothiophene-sulfate - benzoic-acid complex.

2. The process which comprises hydrolyzing a mixture of stereoisomers containing the dl-cis-isomer of a compound represented by the formula:

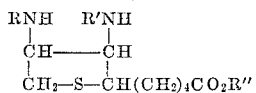

wherein R and R' are acyl groups, one of which is C₆H₅CO—, and R'' is a radical selected from the class consisting of alkyl, aryl and arylalkyl radicals, by heating said mixture of stereoisomers with an aqueous alkali at a temperature of the order of about 140° C. under pressure, acidifying the mixture thus obtained with sulfuric acid to produce an aqueous solution containing a mixture of stereoisomers of 2-(4'-carboxy-butyl)-3:4-diamino-tetrahydrothiophene, benzoic acid and sulfuric acid, and subjecting the resulting solution to fractional crystallization thereby crystallizing the sparingly soluble dl-cis-2-(4'-carboxy-butyl)-3:4-diamino-tetrahydrothiophene - sulfate - benzoic-acid complex.

3. The process which comprises hydrolyzing a mixture of stereoisomers containing the dl-cis-isomer of a compound represented by the formula:

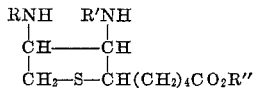

wherein R and R' are acyl groups, one of which is C₆H₅CO—, and R'' is a radical selected from the class consisting of alkyl, aryl and arylalkyl radicals, by heating said mixture of stereoisomers with an aqueous solution of an alkaline earth metal hydroxide at a temperature above 100° C. under pressure, acidifying the mixture thus obtained with sulfuric acid, filtering the resultant aqueous mixture to remove the insoluble alkaline earth metal sulfate and produce an aqueous solution containing a mixture of stereoisomers of 2-(4'-carboxy-butyl)-3:4-diamino-tetrahydrothiophene and at least one molecular equivalent each of benzoic acid and sulfuric acid, and subjecting the resulting solution to fractional crystallization thereby crystallizing the sparingly soluble dl-cis-2-(4'-carboxy-butyl)-3:4-diamino-tetrahydrothiophene-sulfate-benzoic-acid complex.

4. The process which comprises hydrolyzing a mixture of stereoisomers containing the dl-cis-isomer of a compound represented by the formula:

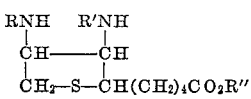

wherein R and R' are acyl groups, one of which is C₆H₅CO—, and R'' is a radical selected from the class consisting of alkyl, aryl and arylalkyl radicals, by heating said mixture of stereoisomers with an aqueous solution of barium hydroxide at a temperature of the order of about 140° C. under pressure, acidifying the mixture thus obtained with sulfuric acid, filtering the resultant aqueous mixture to remove the insoluble barium sulfate and produce an aqueous solution containing a mixture of stereoisomers of 2-(4'-carboxy-butyl)-3:4-diamino-tetrahydrothiophene, and at least one molecular equivalent each of benzoic acid and sulfuric acid, and subjecting the resulting solution to fractional crystallization thereby crystallizing the sparingly soluble dl-cis-2-(4'-carboxy-butyl)-3:4-diamino-tetrahydrothiophene-sulfate-benzoic-acid complex.

5. The process which comprises hydrolyzing a mixture of stereoisomers containing the dl-cis-isomer of 2-(4'-carbomethoxy-butyl)-3-acetamido-4-benzamido-tetrahydrothiophene, by heating said mixture of stereoisomers with an aqueous solution of sodium hydroxide at a temperature of the order of about 140° C. under pressure, acidifying the mixture thus obtained with sulfuric acid to produce an aqueous solution containing a mixture of stereoisomers of 2-(4'-carboxy-butyl)-3:4-diamino-tetrahydrothiophene, approximately one molecular equivalent of benzoic acid, and at least one molecular equivalent of sulfuric acid, and subjecting the resulting solution to fractional crystallization thereby crystallizing the sparingly soluble dl-cis-2-(4'-carboxy-butyl)-3:4-diamino-tetrahydrothiophene-sulfate-benzoic-acid complex.

6. The process which comprises hydrolyzing a mixture of stereoisomers containing the dl-cis-isomer of 2-(4'-carbo-alkoxy-butyl)-3-acetamido-4-benzamido-tetrahydrothiophene, by heating said mixture of stereoisomers with an aqueous alkali at a temperature above 100° C. under pressure, acidifying the mixture thus obtained with sulfuric acid to produce an aqueous solution containing a mixture of stereoisomers of 2-(4'-carboxy-butyl)-3:4-diamino-tetrahydrothiophene, approximately one molecular equivalent of benzoic acid, and at least one molecular equivalent of sulfuric acid, and subjecting the resulting solution to fractional crystallization thereby crystallizing the sparingly soluble dl-cis-2-(4'-carboxy-butyl)-3:4-diamino-tetrahydrothiophene-sulfate-benzoic-acid complex.

7. The process which comprises hydrolyzing a mixture of stereoisomers containing the dl-cis-isomer of 2-(4'-carbo-methoxy-butyl)-3-acetamido-4-benzamido-tetrahydrothiophene by heating said mixture of stereoisomers with an aqueous solution of barium hydroxide at a temperature of the order of about 140° C. under pressure, acidifying the mixture thus obtained with sulfuric acid, filtering the resultant aqueous mixture to remove the insoluble barium sulfate and produce an aqueous solution containing a mixture of stereoisomers of 2'-(4'-carboxy-butyl)-3:4-diamino-tetrahydrothiophene, approximately one molecular equivalent of benzoic acid, and at least one molecular equivalent of sulfuric acid, and subjecting the resulting solution to fractional crystallization thereby crystallizing the sparingly soluble dl - cis - 2 - (4' - carboxy - butyl) - 3:4-diamino - tetrahydrothiophene - sulfate - benzoic-acid complex, having a melting point of about 255–256° C., the empirical formula $C_{16}H_{26}S_2N_2O_8$ and the probable structural formula:

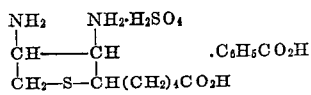

8. The process of separating dl-cis-2-(4'-carboxybutyl) - 3:4 - diamino - tetrahydrothiophene from a mixture of stereoisomers containing said dl-cis-isomer, which comprises forming an aqueous solution containing said mixture of stereoisomers admixed with at least one molecular equivalent each of benzoic acid and sulfuric acid, and subjecting the resulting aqueous solution to fractional crystallization thereby crystallizing the sparingly soluble dl-cis-2-(4'-carboxy-butyl)-3:4-diamino- tetrahydrothiophene - sulfate-benzoic-acid complex, having a melting point of about 255–256° C., the empirical formula $$C_{16}H_{26}S_2N_2O_8$$

and the probable structural formula:

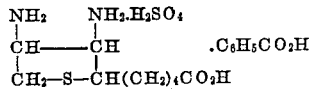

9. A benzoic acid di-cis-2-(4'-carboxy-butyl)-3:4-diamino-tetrahydrothiophene sulfate complex, sparingly soluble in water, having a melting point of about 255–256° C., the empirical formula $C_{16}H_{26}S_2N_2O_8$ and the structural formula:

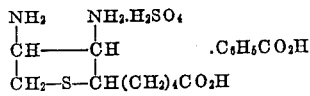

DONALD E. WOLF.
ANTHONY C. SHABICA, Jr.

REFERENCES CITED

The following references are of record in the file of this patent:

Karrer, "Organic Chemistry," 1938, page 428.
Hoffmann, "Advances in Enzymology," vol. 3, pages 295 and 296 (1943).

Certificate of Correction

Patent No. 2,437,719.  March 16, 1948.

DONALD E. WOLF ET AL.

It is hereby certified that error appears in the printed specification of the above numbered patent requiring correction as follows: Column 8, line 1, claim 9, for "di-cis-2-" read *dl-cis-2-*; and that the said Letters Patent should be read with this correction therein that the same may conform to the record of the case in the Patent Office.

Signed and sealed this 11th day of May, A. D. 1948.

[SEAL]

THOMAS F. MURPHY,
*Assistant Commissioner of Patents.*